United States Patent
Ortega

(10) Patent No.: US 11,666,182 B2
(45) Date of Patent: Jun. 6, 2023

(54) SHIELD DEVICE FOR USE WITH A UTENSIL

(71) Applicant: Josue Ortega, Philadelphia, PA (US)

(72) Inventor: Josue Ortega, Philadelphia, PA (US)

(*) Notice: Subject to any disclaimer, the term of this patent is extended or adjusted under 35 U.S.C. 154(b) by 295 days.

(21) Appl. No.: 17/168,250

(22) Filed: Feb. 5, 2021

(65) Prior Publication Data
US 2021/0259474 A1 Aug. 26, 2021

Related U.S. Application Data

(60) Provisional application No. 62/980,332, filed on Feb. 23, 2020.

(51) Int. Cl.
*A47J 43/28* (2006.01)
*A47J 43/10* (2006.01)

(52) U.S. Cl.
CPC ......... *A47J 43/288* (2013.01); *A47J 43/1087* (2013.01); *A47J 43/281* (2013.01); *A47J 43/283* (2013.01)

(58) Field of Classification Search
CPC ...... A47J 43/288; A47J 43/281; A47J 43/283; A47J 43/1087
USPC ..................................................... 294/7, 131
See application file for complete search history.

(56) References Cited

U.S. PATENT DOCUMENTS

| | | | | |
|---|---|---|---|---|
| 830,016 | A | * | 9/1906 | Sims |
| 1,096,204 | A | * | 5/1914 | Taggart ............... A47G 21/001 294/131 |
| 1,330,406 | A | * | 2/1920 | Stricklin ............... A47G 21/02 2/17 |
| 2,436,507 | A | * | 2/1948 | Ellwood ................ A47J 37/07 D7/387 |
| 3,858,320 | A | * | 1/1975 | Neal ..................... A47J 43/283 294/131 |
| D631,206 | S | * | 1/2011 | Parlee ......................... D29/118 |
| 10,258,193 | B1 | * | 4/2019 | Reed ......................... F23Q 2/16 |
| D901,259 | S | * | 11/2020 | Palmby ........................ D7/692 |
| 10,874,249 | B2 | * | 12/2020 | Larman ................. A47J 43/288 |

\* cited by examiner

*Primary Examiner* — Paul T Chin
(74) *Attorney, Agent, or Firm* — Brennan, Manna & Diamond, LLC

(57) ABSTRACT

The present invention relates to protective shield for use with a plurality of interchangeable cooking tools and/or utensils, such as a spatula, spoon, and the like. The protective shield offers protection from splashes from hot oil and grease, exposed heat and flame, and attaches to a handle end of the utensil via a threaded or other secure mechanism. The protective shield is conically shaped and includes a strap and a latch on a circumference of a base of the structure, which is used to expand and retract the size and circumference of the protective shield.

20 Claims, 4 Drawing Sheets

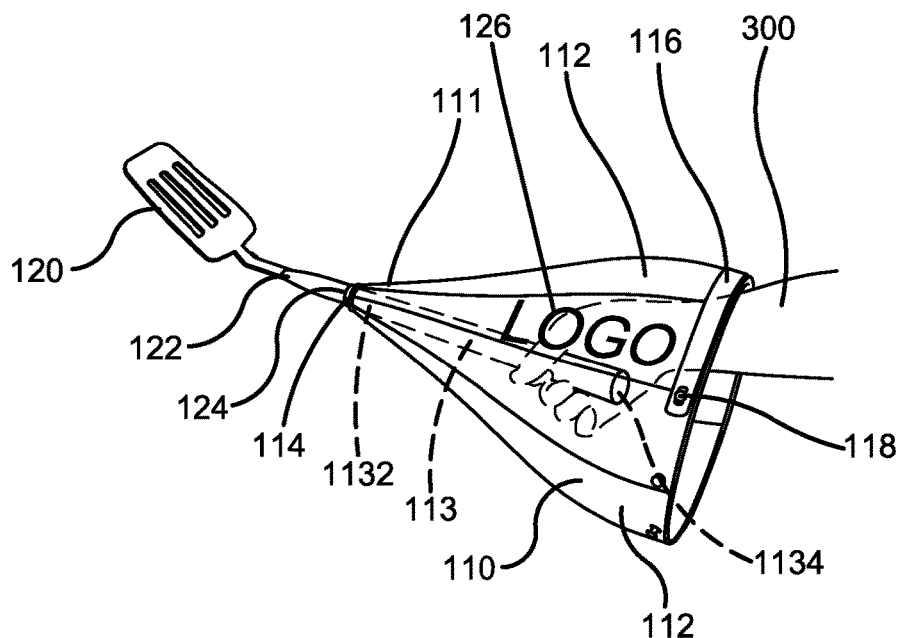
FIG. 3
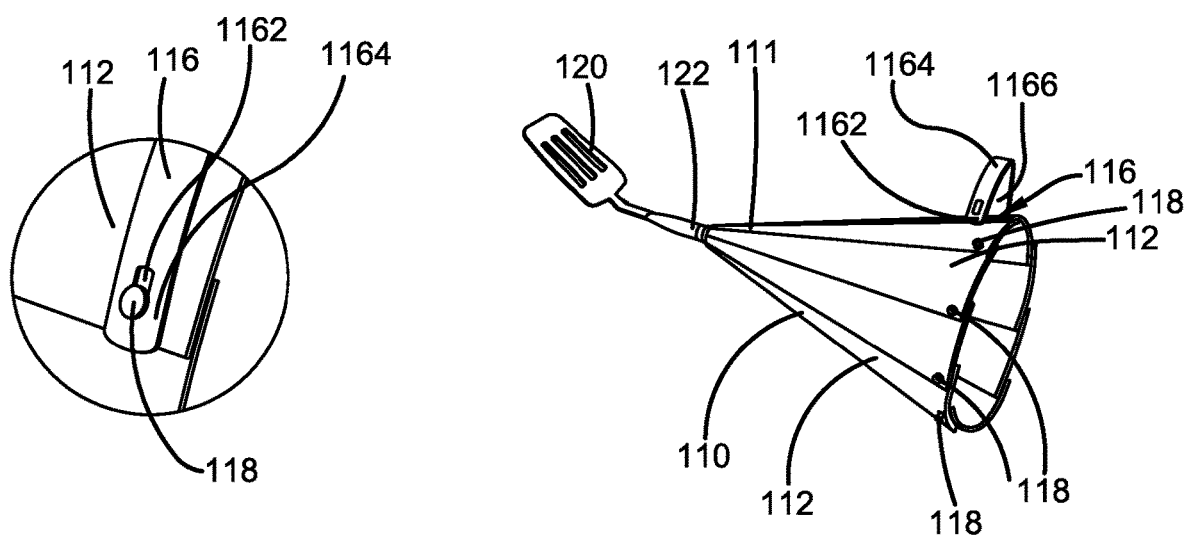
FIG. 4A
FIG. 4B

SHIELD DEVICE FOR USE WITH A UTENSIL

CROSS-REFERENCE TO RELATED APPLICATION

The present application claims priority to, and the benefit of, U.S. Provisional Application No. 62/980,332, which was filed on Feb. 23, 2020 and is incorporated herein by reference in its entirety.

BACKGROUND

The present invention relates generally to the field of cooking utensils. More specifically, the present invention relates to a protective shield or housing attachment for a cooking utensil, such as a spatula, spoon, tong, fork, knife, cutting element or the like. The protective shield attachment for use with a kitchen utensil offers splash prevention from hot oil, grease, water, sauce and the like, as well as protection from the hot edges of pots, pans, burners, etc. The protective shield attachment easily and removably attaches to the handle end of a utensil via a threaded or other securing mechanism, thereby allowing different utensil heads to be attached to the device of the present invention for multi-functional applications. Accordingly, the present specification makes specific reference thereto. Nonetheless, it is to be appreciated that aspects of the present invention are also equally amenable to other similar applications, devices and methods of manufacture.

By way of background, the use of cooking implements and utensils is well known and the same are oftentimes used during the cooking, food preparation and other related processes. More specifically, handheld cooking utensils and tools, such as a spoon, strainer, ladle, grilling equipment, fork, whisk and the like, are oftentimes used in the daily routine of a person cooking and preparing food. Unfortunately, a user grasping a handheld cooking tool during the cooking process may be exposed to the splashing or splattering of hot grease and/or oils, food particles popping, the heat of the metal portion of the cooking utensil, appliances and the like. This is particularly true while the user is stirring or manipulating food during the cooking process over a heat source. Further, the exposure of the user's hand or arm areas to such hazards could result in significant burns. For example, the heat, flame, grease, oil or other hot substances may pop onto the user's skin, and leave the user with a painful burn. The burn marks may remain on the user's skin for quite some time, depending on the severity of the burn, and could result in blisters, sores and/or an infection. Oftentimes, the burns require medical attention and leave permanent scars. Such scenarios may be exceptionally dangerous for the amateur cook or chef, who lacks the same level of experience as a professional cook or chef.

Further, while cooking, grilling, preparing, baking and/or the like, there are many additional dangers due to the user's proximity to the heat source. For example, cooking with hot liquids, including oil, is a dangerous and hazardous activity if not done properly, and cooks are always at risk of burning themselves when liquids (e.g. oil, grease, water, sauce, etc.) splash out of the hot cooking pan and onto to the surrounding areas, including the cook's hands and arms. Further, oil and other flammable liquids (e.g., alcohol-based products), when exposed to an open flame (e.g., a gas burner) can catch fire and lead to additional hazards and risks to individuals in the kitchen.

Liquids and oils oftentimes splash out of a cooking pan due to multiple reasons. For instance, when a chef places meat into a pan of heated oil, the oil reacts with the meat, especially the water within the meat, to create a chemical reaction that sizzles and bubbles. Accordingly, the bubbling and other splattering has the potential to splash onto the chef/cook's skin. Another situation that puts the cook at risk is when the cook adds wine or other alcoholic beverages to a heated cooking pan. More specifically, when the alcohol ignites, a blue tinged flame results that oftentimes briefly expands outside the immediate cooking area until the alcohol is consumed, and places the cook in additional danger of being burned.

While many cooking and/or grilling tools, such as spatulas, forks, knives, tongs, etc., may have a handle that is long enough to keep the holder's hand sufficiently far away from the heat source while manipulating the food being cooked, the distance offered by such handles may not always be enough to prevent injury to the individual from the above referenced splattering. For example, as grills get larger and larger, it is increasingly more difficult to find cooking and/or grilling tools that are designed to sufficiently protect the user from the heat source and avoid injury.

To combat or reduce the above described risks, various cooking accessories are available in the market that provide the user some degree of protection. One such product is heat resistant cooking gloves, which can be worn by a user while cooking, grilling, baking and the like. However, while heat resistant cooking gloves can keep a user's hands protected from burns and cuts, such gloves typically only protect the hands of the user, thereby leaving the user's arms exposed to heat, oil splash, grease splatter, flame and the like. Stated differently, while such cooking gloves reduce the risk of the user suffering burns to the hand, the user's arms remain exposed and could suffer significant burns or injuries. Further, cooking gloves may be expensive and not within every cook's budget and, even if purchased, the user has to remember to put the gloves on whenever he or she is cooking. If the user forgets to bring the gloves with him or her (e.g., if cooking at a remote location) or to wear the gloves, the hands and/or arms of the user are exposed to the dangers of being burned and/or cut during the cooking process.

In view of the hazards in the kitchen or other food preparation areas during cooking, especially from the splattering of hot grease or hot oil, various items have been developed for protecting the individual. One such example is a splash screen, which is designed to be placed over the pan or pot in which the food is being cooked to provide a cover therefor and to prevent the grease from splattering out of the pan or pot. While such covers may protect the surrounding areas, they do not protect the individual from grease splatters during those times when it is necessary to remove the cover to, for example, stir or otherwise manipulate the food products in the pan. Other accessories, such as protective goggles and face masks, can be utilized by the user to protect themselves from grease and oil splatter, food popping or the like. However, while such protective goggles or face masks effectively protect the user's face and eyes, they do not protect the user's hands and/or arms from the dangers referenced above.

Therefore, there exists a long felt need in the art for a shield device for use with a cooking utensil for protecting a user's hands and/or arms from a heat source and other hazards present while cooking. More specifically, there is a long felt need in the art for a shield that protects the hands and forearm areas of the user from becoming burned by, for example, hot oil splashes, hot grease splatters, food popping, hot cooking surfaces, and the like. There is also a long felt need in the art for a hand and forearm guard which may be removably but securely attached to various different cooking utensils, thereby eliminating the need for the user to have to separately purchase and store multiple shield devices for each cooking utensil. Moreover, there is a long felt need in the art for a protective shield device that reduces the burden on the user to have to remember and carry with them separate shielded kitchen accessories and tools. Finally, there is a long felt need in the art for an easily accessible, convenient and affordable shield for a cooking utensil that is relatively inexpensive to manufacture and safe and easy to use.

The subject matter disclosed and claimed herein, in one embodiment, comprises a protective shield that is removably attachable to a cooking tool or utensil, such as a spatula, spoon, fork, whisk and the like. The protective shield attachment for use with a kitchen utensil offers protection for the wearer from cuts or burns that may be caused by, for example, hot oil or grease splashing out of the cooking pot or pan, heated food popping, hot cooking surfaces and the like. More specifically, the shield attachment of the present invention connects to the handle end of a cooking utensil via, for example, a threaded connection or other suitable attachment means, thereby making it interchangeable with a plurality of different utensil heads and multifunctional applications. In one embodiment, the protective shield is a generally conically shaped structure that includes a strap and a latch on a circumference of a base of the structure, which may be used to expand and retract the size of the shield. The shield integrated cooking tool offers a simple and convenient device for preventing burns and other injuries from occurring to the hand, wrist, and forearm area while cooking or preparing food.

In this manner, the shield attachment device of the present invention accomplishes all of the forgoing objectives, and provides a relatively convenient and easy solution for protecting a wearer from a number of hazards traditionally associated with cooking, preparing and manipulating food products, such as cuts and burns to the hands and forearms. The unique shield attachment of the present invention comes with different cooking utensils, is readily interchangeable and easy to install while cooking, thereby reducing the costs and burdens on users. Finally, the improved shielding attachment of the present invention can be used with a variety of different utensil heads for multifunctional applications in cooking and food preparation, thereby eliminating the need for the user to both purchase and store a separate shied device for each commonly used cooking utensil.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, is a protective shield integrated with a cooking tool, such as a spatula, spoon, whisk, tong, fork, strainer, grader, probe or the like, that offers protection to the wearer's hands and forearm areas from, for example, hot oil and grease splashing out of the cooking surface or pan, open flames, hot cooking surfaces and the like. The shielding attachment may be integrated with, or removably attached to, the handle end of a cooking utensil via, for example, a threaded connection or other securing mechanism, thereby allowing different utensil heads to be quickly and easily attached for multifunctional applications. The protective shield, in one embodiment is a conically shaped structure that includes a strap and a latch on a circumference of a base of the structure, which is used to expand and retract the shield size of the shield. The shield structure is preferably comprised of a flame retardant material that is capable of withstanding splashes of relatively hot liquids (e.g., those reaching boiling temperature).

The subject matter disclosed and claimed herein, in one further embodiment thereof, comprises a shield attachment having a spatula portion with a handle with an opening, and a conically shaped and flexible protective shield with a holder which is attached to the handle through a threaded mechanism. The protective shield is adapted for use with a plurality of interchangeable cooking tools or utensils, and is not limited to spatulas. Further, other attachment mechanisms may be used for attaching the spatula to the protective shield structure, such as a male and female plug combination or other snap connector configurations.

In yet another embodiment, a protective food cooking and manipulation tool is provided. The food cooking and manipulation tool comprises a cooking implement for manipulating a food product, and a generally conically shaped and flexible protective shield with a holder inside which is removably attached to a handle of the cooking implement via a threaded connection. An opening at a base of the protective shield enables a user to insert his or her hand therein to manipulate the cooking implement, which will also be protected from being burned by, for example, oil of grease splatter, cuts, hot cooking surfaces, open flames and the like. The protective shield portion of the tool is extendable and retractable in size via a unique strap and latch mechanism to suit the user's needs and/or preferences.

In a further exemplary embodiment of the present invention, a protective shield for use with cooking tools and utensils is provided. The relatively flexible protective shield is comprised of a generally conical, tapered, or funnel shaped body having an outer surface, a small hole or opening on one end of the body that is capable of being attached to a cooking tool or utensil via a threaded connection, and an opposite end of the body that is repositionable between a first size and a second size via a strap and latch. Further, the outer surface of the body is further comprised of an easy to clean and flame retardant coating.

In a further exemplary embodiment of the present invention, a method for using a shield attachment with interchangeable cooking utensils in a cooking operation is described. The method comprises the steps of (a) initially attaching a protective shield to a kitchen utensil using a threaded mechanism; (b) expanding or shrinking the circumference of one end of the protective shield structure using a strap and latch mechanism provided on the outer surface of the protective shield; (c) inserting a hand inside an opening on the base of the protective shield; and (d) using the integrated shielding attachment to cook, prepare and/or manipulate a food product while also preventing the user's hands and arms from getting cut of burned from, for example, hot grease or oil splatter, exposed flame, heated surfaces and the like.

In yet another exemplary embodiment of the presently described invention, a cooking accessory is described and includes a deformable material formed into the general shape of a cone and that is attachable to a cooking utensil.

More specifically, the cone has a first narrow end and a second wider end, wherein the first narrow end further comprises an elongated staff protruding at least part way through an opening in the narrow end. The elongated staff has a first end for grasping, and a second end for connecting to a cooking tool or utensil. More particularly, a cooking or food preparation utensil is also provided that has a corresponding mating element on a first end for attachment to the staff, and a cooking or food preparation element on a second end, opposite the first end. A latching mechanism is further disposed on the second wider end of the cone for adjusting an interior area of the cone.

In a further embodiment of the presently described invention, a shielding device for use in food preparation is presented and includes a cone shaped protective shield having a narrow end and a wide end. The cone is changeable from an open position to a closed position, and further comprises a handle. More specifically, the handle extends at least part way out of the narrow end of the cone in the direction of the wide end, with the majority of the handle being contained within an interior portion of the cone. Further, a securing strap is disposed on the wide end of the cone and a series of protuberances are disposed about a periphery of the wide end. At least one of the protuberances engages with the securing strap. A utensil for food preparation is also provided and the utensil has a first end for use in food preparation, and a second end for securing the utensil to the handle.

In yet another embodiment of the presently described invention, a method of using a protective cooking or food preparation accessory is described. The method comprises the step of initially providing a deformable protective accessory, wherein the accessory is generally cone shaped and has a narrow end, a wide end, and a handle having a coupling on its first end and a second end that extends at least part way out of the narrow end of the cone in the direction of the wide end. The protective accessory further comprises a securing strap disposed on the wide end of the cone, and a series of protuberances disposed about a periphery of the wide end, wherein at least one of the protuberances engaged with the securing strap. A cooking utensil is then selected, wherein the utensil has a first end for use in food preparation and a second end for securing to the handle. Next, the second end of the cooking utensil is removably attached to the coupling on the first end of the handle, and the deformable protective accessory is changed from a closed, stored position to an open position ready for use. Finally, the user's hand is inserted into the wide end, and the handle is grasped.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which:

FIG. 3 illustrates a perspective view of one possible embodiment of a combination cooking utensil and integrated shield attachment device of the present invention in accordance with the disclosed architecture, wherein the integrated shield attachment device is in an open position;

FIG. 4A illustrates a close up and perspective view of one potential embodiment of the size adjustment mechanism of the protective shield of the present invention in accordance with the disclosed architecture;

FIG. 4B illustrates a perspective view of one possible embodiment of a combination cooking utensil and integrated shield attachment device of the present invention in accordance with the disclosed architecture, wherein the integrated shield attachment device is in an open position;

DETAILED DESCRIPTION

The innovation is now described with reference to the drawings, wherein like referenced numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As previously stated, there is a long felt need in the art for a shield device and cooking utensil combination that protects the hands and forearm areas of the user from becoming burned by, for example, hot oil splashes, hot grease splatters, food popping, hot cooking surfaces, and the like. There is also a long felt need in the art for a hand and forearm shield device that may be removably attached to various different cooking utensils, thereby eliminating the need for the user to have to separately purchase and store multiple shield devices for each needed cooking utensil. Moreover, there is a long felt need in the art for a protective shield device that is comprised of a heat resistant and flame retardant material, and that is repositionable between an opened and a closed position to better suit the wants and needs of the user.

As set forth herein, various embodiments of the present invention, systems, methods and apparatuses are provided to make the cooking process safer for the individual. With reference to the figures attached hereto, methods and devices in accordance with the present disclosure generally comprise foldable, non-foldable, retractable and bendable protection shields that may be temporarily or permanently attached to the body or to the handle of cookware, tools, utensils, and the like. These shields may be made, for example, from plastic, metal, wood, or other natural or synthetic materials which are able to withstand limited exposure to heat without melting or catching fire.

The present invention, in one exemplary embodiment, is an adjustable protective shield attachment for use with a plurality of different cooking utensils and tools. For example, a threaded mechanism may be used for attaching the protective shield to the particular cooking utensil needed. The protective shield itself is a generally conical or tapered body structure with both narrow and broad open ends. The narrow end has a threaded portion for connecting with the selected utensil head, and the broad open end is repositionable in size and secured with a strap and latch mechanism positioned over its circumference, as explained more fully below.

Figure 1:
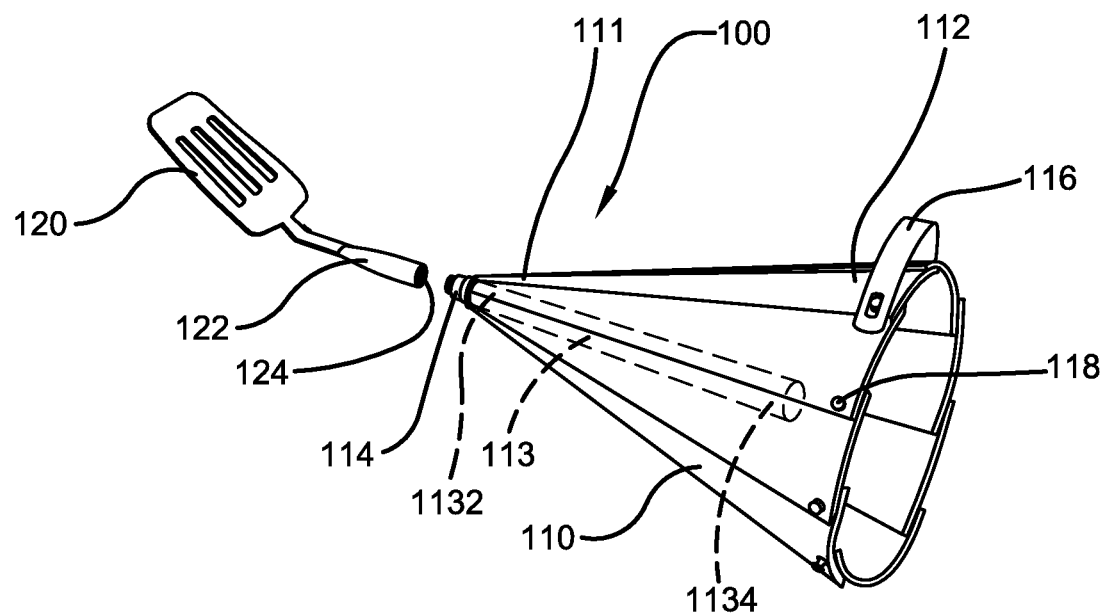
FIG. 1 illustrates a perspective and partially exploded view of one possible embodiment of a cooking utensil and shield attachment of the present invention in accordance with the disclosed architecture.

Referring initially to the drawings, FIG. 1 illustrates a partially exploded view of one possible embodiment of a combination utensil and shielding attachment device 100 of the present invention in accordance with the disclosure. More specifically, the combination device 100 is comprised of a protective shield 110 and a spatula 120. The spatula 120 is attached to a substantially straight handle 122 having a longitudinal opening 124 in one end thereof for receiving a portion of the protective shield structure 110 via a threaded mechanism, as explained more fully below.

The protective shield 110 is preferably a conically shaped or tapered body with a plurality of plates overlapping each other and connected through latches 118 or protuberances. The plate-based structure allows the protective shield 110 to easily expand or retract in size and to adjust as per the size requirements of the hand of the user, as explained more fully below. As best shown in FIG. 1, the conically shaped protective shield 110 further comprises a narrow open end 111 and a broad open or wide end 112. A strap 116 is located along a portion of the circumference of the broad open end 112 of the protective shield 110, or where the hand of the user is inserted, and is attached on the latches, protuberances or snaps 118 on the plates of the protective shield 110 and extending around the base 112. The base 112 or wide end has a periphery which defines an interior volume of the cone. The latches, protuberances or snaps 118 are disposed around the periphery of the base 112. The volume may be adjusted from an open use position to a closed storage position, and anywhere in between, depending upon the wants and needs of the user.

A utensil holder 113 is a substantially elongated straight handle or staff having a first end 1132 and a second end 1134, the first end 1132 being fixed to a threaded structure 114, which is inserted into the narrow open end 111 of the conical or cone shaped structure 110 and is fixed thereto via, for example, a threaded connection. More than 50% of the holder or staff 113 is contained within the cone and preferably more than 75% of the holder or staff 113 is contained within the cone. Notwithstanding, the connection point of the utensil holder 113 and the spatula handle 121 does not need to be threaded, and other fixing or locking mechanisms may also be used, such as a push lock mechanism or other methods known in the state of the art. The second end 1134 of the utensil holder 113 is utilized to hold and grasp the handle by a hand of the user, and to use the protective combination cooking tool 100 to manipulate, prepare or stir food while cooking, grilling, frying or the like. In one embodiment, the shielding attachment is preferably about 12 to 18 inches in length and, at the narrow end of the cone, the space is between 3 and 5 inches to accommodate the adult human hand when grasped around the handle 113.

Additionally, while the cooking tool 120 shown in the FIGS. is a spatula, cooking tool 120 may be any other sort of kitchen utensil including, without limitation, a dipper, ladle, soup spoon, fork, grilling fork, tong, whisk, or other types of cooking utensil or food manipulation or preparation devices. The utensil may be made up of metal, plastic, silicone, or any other suitable material. Similarly, the protective shield 110 can be made up of any material such as plastic, metal, nylon plastic, food-grade silicone, other BPA-free materials, and the like, so long as the materials used are flame retardant or have a sufficient heat resistance, and can withstand exposure to hot oil, grease, open flames, etc. for a limited period of time without melting or catching fire. Moreover, the material used for manufacturing the cooking utensil 120 and the protective shield 110 should be non-toxic, thereby ensuring safety while cooking and preparing the food. The protective shield 110 can also be formed of a transparent or translucent material, and is designed so that it does not interfere with use of the cooking utensil or the preparation of the food.

In an alternate embodiment, the protective shield 110 may be of any other geometric shape such as tubular, cylindrical, elliptical or the like, as per preferences of the user. The shield attachment or cooking accessory product 100 is dishwasher safe and can be easily washed with soap and water, for example, to clean splattered foodstuff and grease therefrom. The protective shield 110 may be attached to different utensil structures 120, based on the requirements of the user during the preparation of the food. The cooperating and overlapping plates or panels of the protective shield 110 may be opaque, translucent or transparent, and may also have a texture as per the user's preferences. Further, the shield 110 may be of any color such as blue, pink, green, red or any other color suitable to the user, and may further comprise a particular theme such as a sports team, event, automobile or other trademark 126 and the like.

Figure 2:
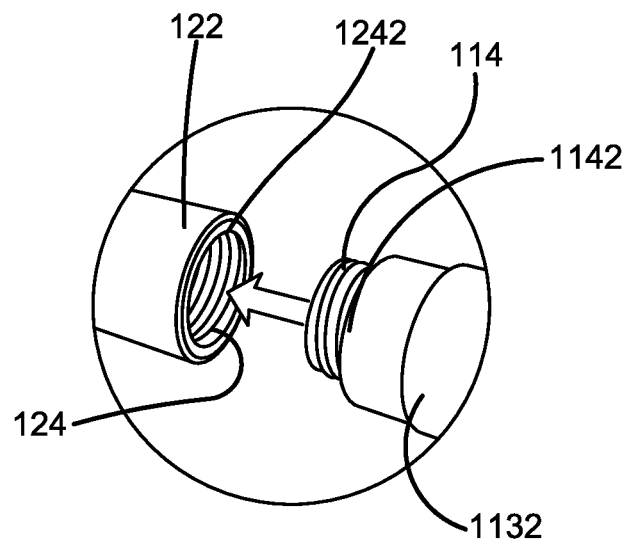
FIG. 2 illustrates a close up and perspective view of one possible embodiment of the mechanism used to removably attach a cooking utensil to a protective shield of the present invention in accordance with the disclosed architecture, wherein the mechanism is a male/female threaded connection.

FIG. 2 illustrates a close up and perspective view of one possible embodiment of the mechanism used to removably attach a cooking utensil to a protective shield 110 of the present invention in accordance with the disclosed architecture, wherein the mechanism is a male/female threaded connection. More specifically, the handle 122 of the utensil 120 has a longitudinal opening 124 therein, wherein the inner structure of the handle comprises grooves 1242 for receiving a threaded structure 114. The first end 1132 of the handle 113 is fixed at the narrow open end 111 of the shield attachment (see e.g., FIG. 1) to which a threaded structure 114 is affixed. The threaded fixation structure 114 defines one or more threads 1142 disposed circumferentially about the outer surface of the threaded fixation structure 114. Specifically, the threads of the threaded fixation structure may be arranged in a helical pattern. As best shown in FIG. 2, the threaded structure 114 further comprises a series of circular shaped threads 1142, wherein the threaded structure 114 is inserted into the opening 124 of the handle 122 and is rotated to engage the threaded fixation structure 114 inside the opening 124. The threads 1142 snugly fit to the grooves 1242 of the utensil handle 122, thereby removably securing the protective shield 110 to the utensil structure 120. Alternatively, other attachment means for mechanically joining the protective shield 110 to the utensil structure 120 may be employed.

FIG. 3 illustrates a perspective view of one possible embodiment of a combination cooking utensil and integrated shield attachment device 100 of the present invention in accordance with the disclosed architecture, wherein the integrated shield attachment 110 is in an open position. More specifically, the protective shield 110 is fixed to the spatula or other utensil handle 122 via a threaded mechanism. In use, a user's hand 300 enters inside the shield attachment 100 broad open end 112, and grasps a second end 1134 of the utensil holder 113. Once the user holds and grasps the utensil holder 113 properly, the user may use the shield attachment device 100 to stir, manipulate, prepare or otherwise reposition food while cooking. The holder 113 may also have a grip at the second end 1134 to enable a user to hold the utensil holder 113 properly. The innovative design of the shield attachment 100 of the present invention enables a user to cook safely, without getting burned from hot oil splash, popped food particles, hot grease splatter, flame, heat or the like.

FIG. 4A illustrates a close up and perspective view of one potential embodiment of the strap 116 of the size adjustment mechanism of the protective shield 110 of the present invention in accordance with the disclosed architecture. As stated above, the protective shield 110 comprises overlapping or cooperating plates or panels that include a latch 118 joining each of the two overlapping plates or panels. The strap 116 is shorter in length than the circumference of the broader end 112 of the protective shield 110 and has two ends with openings or holes 1162 into which latches 118 may be locked. The holes 1162 have a generally bulbous shape with a narrow end and a wide bulbous end so that the latch or protuberance can be inserted into the wide or bulbous end and then locked into the narrow end. The opening 1162 at the first end 1166 of the strap 116 is preferably fixed, and the opening at the second end 1164 is adjusted to engage any of the latches 118 to expand or retract the size (i.e., the circumference) of the protective shield 110 to accommodate the hand of the user. The openings 1162 may be equally spaced along the strap 116, or may be provided in any sort of configuration so that the strap 116 can be adjusted to varying sizes. The latch 118 is inserted into the hole 1162 to lock the strap 116, and fix the circumference of the broader end 112 of the protective shield 110 to suit user need and/or preference.

FIG. 4B illustrates a perspective view of one possible embodiment of a combination cooking utensil and integrated shield attachment device 100 of the present invention in accordance with the disclosed architecture, wherein the integrated shield attachment device 110 is in an open position. More specifically, the first end 1166 of the strap 116 may be fixed by locking onto one of the protuberances, detents or latches 118, and the second end 1164 of the strap 116 can be fixed to any of the latches 118 placed proximal or distant the second end 116. The latches, protuberances or snaps 118 may be provided in a regularly or consistently spaced apart configuration around the edge of the wide end 112 of the cone for adjusting the circumference of the shield cone 110 to a particular size. Locking the opening 1162 at the second end 1164 to the proximal latch 118 provides an expanded or open structure of the protective shield 110, wherein locking the opening 1162 at the second end 1164 to the distant latch or protuberance 118 provides a retracted or closed structure of the protective shield 110.

As previously stated, the expanded or opened protective shield 110 broadens the second end 112, thereby allowing a user to insert his or her hand into the opening and hold the utensil holder within the protective shield 110, safe from hot grease splatters, oil, flame, or the like. Also, in an expanded or opened state, the plates or panels of the protective shield 110 are least overlapped. In a reduced or closed state, the second end 112 is narrower or smaller, thereby reducing the overall size of the device 100 and allowing the user to easily store the device in a kitchen drawer or cabinet. In a retracted or closed version, the plates of the protective shield 110 are overlapped to the maximum extent.

Figure 5:
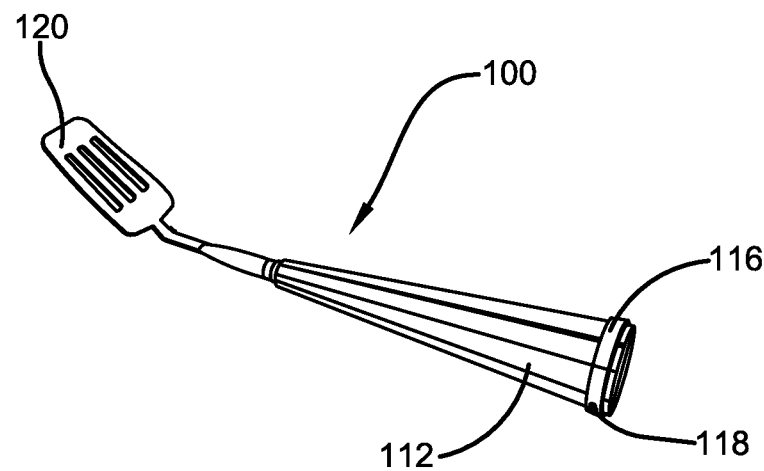
FIG. 5 illustrates a perspective view of one possible embodiment of a combination cooking utensil and integrated shield attachment device of the present invention in accordance with the disclosed architecture, wherein the integrated shield attachment device is in a closed position.

FIG. 5 illustrates a perspective view of one possible embodiment of a combination cooking utensil and integrated shield attachment device 100 of the present invention in accordance with the disclosed architecture, wherein the integrated shield attachment device 110 is in a closed position. More specifically, the strap 116 is locked to the distal latch 118 or protuberances, thereby retracting, shrinking or compacting the conical or cone shape of protective shield 110. In this retracted or closed mode, the combination device 100 is reduced in size and occupies less space, which enables a user to more easily store the device 100. The protective shield 110 may thus be moved from an open use position as shown for example in FIG. 4B to the closed storage position as shown in FIG. 5.

Figure 6:
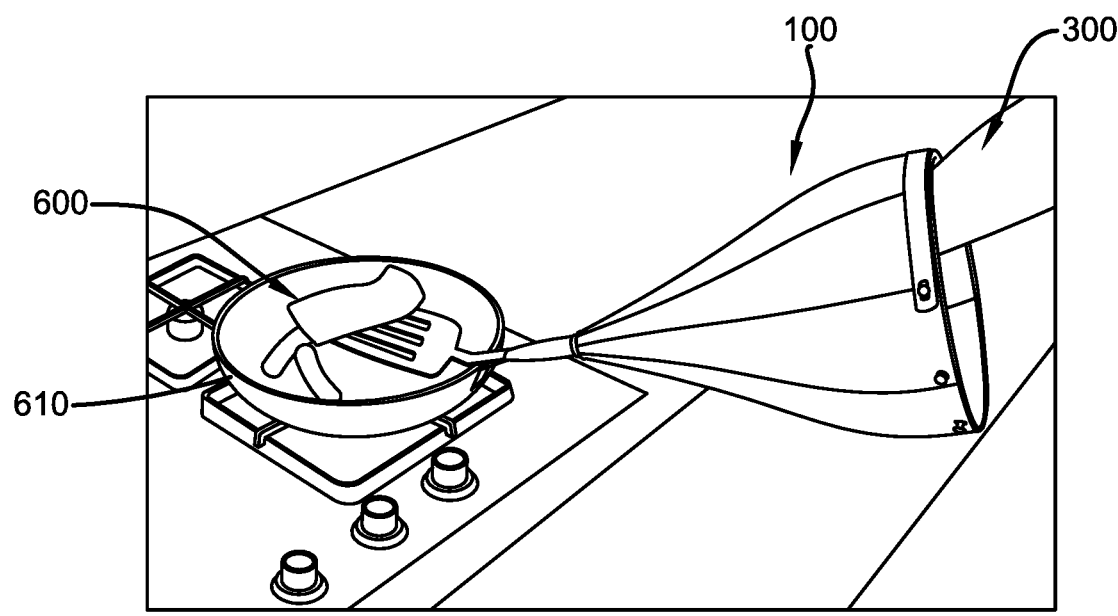
FIG. 6 illustrates a perspective view of one possible embodiment of a combination cooking utensil and integrated shield attachment device of the present invention in accordance with the disclosed architecture, and being used by a user in a cooking operation.

FIG. 6 illustrates a perspective view of one possible embodiment of a combination cooking utensil and integrated shield attachment device 100 of the present invention in accordance with the disclosed architecture, and being used by a user 300 during a cooking operation. More specifically, the user 300 inserts his or her hand inside the protective shield 110 and grasps the utensil holder end to easily stir or manipulate food 600 being cooked or prepared in a pan 610 by using a spatula 120 or other utensil. The protective shield 110 prevents the user's hand 300 from, for example, being burned by hot oil or hot grease splatter, exposed flame, or heat while cooking. As explained more fully below, other types of utensils, such as a ladle, fork, grilling spoon, whisk, tong or the like may be attached to the protective shield 110 as per the preferences of the user.

Figure 7:
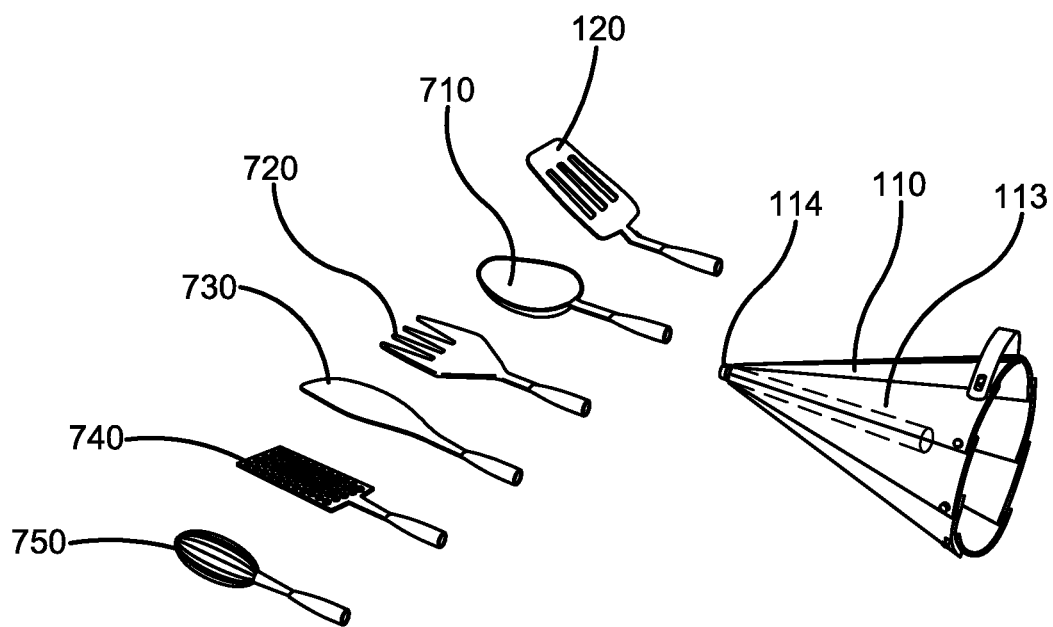
FIG. 7 illustrates a perspective and partially exploded view of one possible embodiment of a kit comprising a plurality of different cooking utensils that can be removably attached to the shield attachment of the present invention in accordance with the disclosed architecture.

FIG. 7 illustrates a perspective and partially exploded view of one possible embodiment of a kit comprising a plurality of different cooking utensils that can be removably attached to the shield attachment 110 of the present invention in accordance with the disclosed architecture. More specifically, FIG. 7 illustrates a plurality of replaceable head utensils such as a spatula 120, a spoon 710, a fork 720, a knife 730, a grader 740, and a whisk 750 that may be attached to protective shield 110 via a threaded mechanism, such as the threading structure 114. Alternatively, other connection means may also be used including, without limitation, male/female adaptors, screws, snaps, slides, hook and loop type fasteners, clamps, etc.

The materials used for the various embodiments described herein may be further comprised of various heat resistant materials, such as high temperature plastics, ceramics, metals, and the like, that will not be detrimentally affected by the temperature of the oil and heating elements described herein.

Certain terms are used throughout the following description and claims to refer to features or components. As one skilled in the art will appreciate, different persons may refer to the same feature or component by different names. This document does not intend to distinguish between components or features that differ in name but not structure or function. As used herein "spatula", "spoon", "fork" and "kitchen utensil" are interchangeable and refer to the kitchen utensil head of the present invention. The terms "hot oil splash", "hot grease splatter", and the like may also be used interchangeably.

Notwithstanding the forgoing, the combination device 100 of the present invention and its various components can be of any suitable size and configuration as is known in the art without affecting the overall concept of the invention, provided that it accomplishes the above stated objectives. One of ordinary skill in the art will appreciate that the size, configuration and material of the combination device 100 as shown in the FIGS. are for illustrative purposes only, and that many other sizes of the device 100 are well within the scope of the present disclosure. Although the dimensions of the device 100 are important design parameters for user convenience, the combination device 100 may be of any size that ensures optimal performance during use and/or that suits user need and/or preference.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A cooking accessory comprising;
    a cone comprising a narrow end, an interior space, and a wide end;
    a handle having a first end and a second end, wherein the first end is positioned within the interior space;
    a cooking utensil comprising a mating element for engaging the second end of the handle, and a cooking element on an opposite end of the mating element; and
    a latching mechanism disposed on the wide end of the cone for adjusting a size of the interior space of the cone.

2. The cooking accessory of claim 1, wherein the second end of the handle is threaded.

3. The cooking accessory of claim 2, wherein the mating element of the cooking utensil has a thread that cooperates with the threaded handle.

4. The cooking accessory of claim 1, wherein more than 50% of a length of the handle is contained within the interior space.

5. The cooking accessory of claim 1, wherein the cone is further comprised of a plurality of linked together panels.

6. The cooking accessory of claim 1 further comprising an adjustment strap extending around at least a portion of a circumference of the wide end of the cone, wherein the adjustment strap has a plurality of spaced apart openings therein.

7. The cooking accessory of claim 6, wherein each of the plurality of spaced apart openings is comprised of a wide end and a narrow locking end.

8. The cooking accessory of claim 1 further comprising a plurality of attachment points spaced apart along a circumference of the wide end of the cone.

9. The cooking accessory of claim 1, wherein the cone may be repositioned from an open position to a closed position.

10. The cooking accessory of claim 1, wherein the cooking element is one of a spatula, a spoon, a fork, a tong, a whisk, and a cutting element.

11. A shielding device for use with a cooking utensil, the shielding device comprising;
    a protective shield in the shape of a cone and comprising a narrow end, a wide end, and an interior space positioned between the narrow end and the wide end, wherein the protective shield is repositionable between an open position and a closed position;
    a handle having a first end that extends into the interior space, and a second end that extends outwardly from the narrow end of the protective shield, wherein the second end of the handle comprises a coupling for engaging the cooking utensil;
    a securing strap disposed on the wide end; and
    a plurality of protuberances disposed about a periphery of the wide end in a spaced apart fashion, wherein at least one of the plurality of protuberances is engaged with the securing strap.

12. The shielding device for use with a cooking utensil of claim 11, wherein the coupling is threaded.

13. The shielding device for use with a cooking utensil of claim 11, wherein the securing strap has at least one opening, and the plurality of protuberances are equally spaced about the periphery of the wide end of the protective shield.

14. The shielding device for use with a cooking utensil of claim 11, wherein the protective shield is comprised of a plurality of interconnected panels.

15. The shielding device for use with a cooking utensil of claim 11, wherein the protective shield is comprised of a deformable material.

16. The shielding device for use with a cooking utensil of claim 11, wherein the protective shield is comprised of a flame retardant material that also has a limited heat resistance.

17. The shielding device for use with a cooking utensil of claim 11, wherein the protective shield is between 12 to 18 inches in length.

18. A method of using a protective cooking accessory comprising the steps of:
    providing the protective cooking accessory in a closed position, wherein the protective cooking accessory is deformable and cone shaped and is comprised of a narrow end, a wide end, an interior space, a securing strap, a plurality of protuberances disposed about a periphery of the wide end in a spaced apart fashion, and a handle extending into the interior space, wherein the handle is comprised of a coupling end;
    expanding the protective cooking accessory from the closed position to an opened position;
    selecting a cooking utensil, wherein the cooking utensil is comprised of a first end for use in preparation of a food and a second end;
    inserting a hand into the wide end;
    grasping the handle; and
    securing the second end of the cooking utensil to the coupling end of the handle.

19. The method of claim 18, wherein the cooking utensil is selected from a group comprising a spatula, a spoon, a fork, a tong, a whisk, and a cutting element.

20. The method of in claim 18, wherein the coupling end is threaded.

\* \* \* \* \*